United States Patent [19]

Ancell

[11] 4,301,917
[45] Nov. 24, 1981

[54] MEANS FOR HOLDING FLEXIBLE SHEETS
[75] Inventor: Herbert G. Ancell, San Rafael, Calif.
[73] Assignee: BankAmerica Corporation, San Francisco, Calif.
[21] Appl. No.: 132,814
[22] Filed: Mar. 28, 1980
[51] Int. Cl.³ .................. B65D 83/12; A47F 1/06
[52] U.S. Cl. ............................ 206/39.5; 206/357; 221/41; 221/303
[58] Field of Search ............ 206/39.5, 233, 357, 206/425, 449; 221/41, 63, 303, 232, 312 C

[56] References Cited

U.S. PATENT DOCUMENTS

| | | | |
|---|---|---|---|
| 806,985 | 12/1905 | Mallery | 206/39.5 |
| 933,663 | 9/1909 | Pallock | 221/41 |
| 3,059,761 | 10/1962 | Kuhnl | 206/357 |
| 3,543,918 | 12/1970 | Waterman | 206/357 |
| 4,073,407 | 2/1978 | Pentney | 206/357 |

FOREIGN PATENT DOCUMENTS

| | | | |
|---|---|---|---|
| 164443 | 8/1955 | Australia | 206/357 |
| 484161 | 8/1953 | Italy | 221/63 |

Primary Examiner—Herbert F. Ross
Attorney, Agent, or Firm—Flehr, Hohbach, Test, Albritton & Herbert

[57] ABSTRACT

A holder is provided for microfiche or other types of flexible sheets. The holder comprises a generally rectangular body having first and second major walls supported in substantially parallel relation to define a cavity therebetween in the body. A slot is formed along one side of the body extending between the first and second major walls through which microfiche enters and exits the cavity. A labyrinth-type lock is provided for retaining microfiche in the cavity, consisting of a projecting lip adjacent the slot on the first major wall and a ridge positioned inwardly from the lip on the second major wall. An opening is formed in the first major wall opposite the ridge to permit microfiche in the cavity to be contacted through the opening and guided around the ridge and the projecting lip for removal.

5 Claims, 6 Drawing Figures

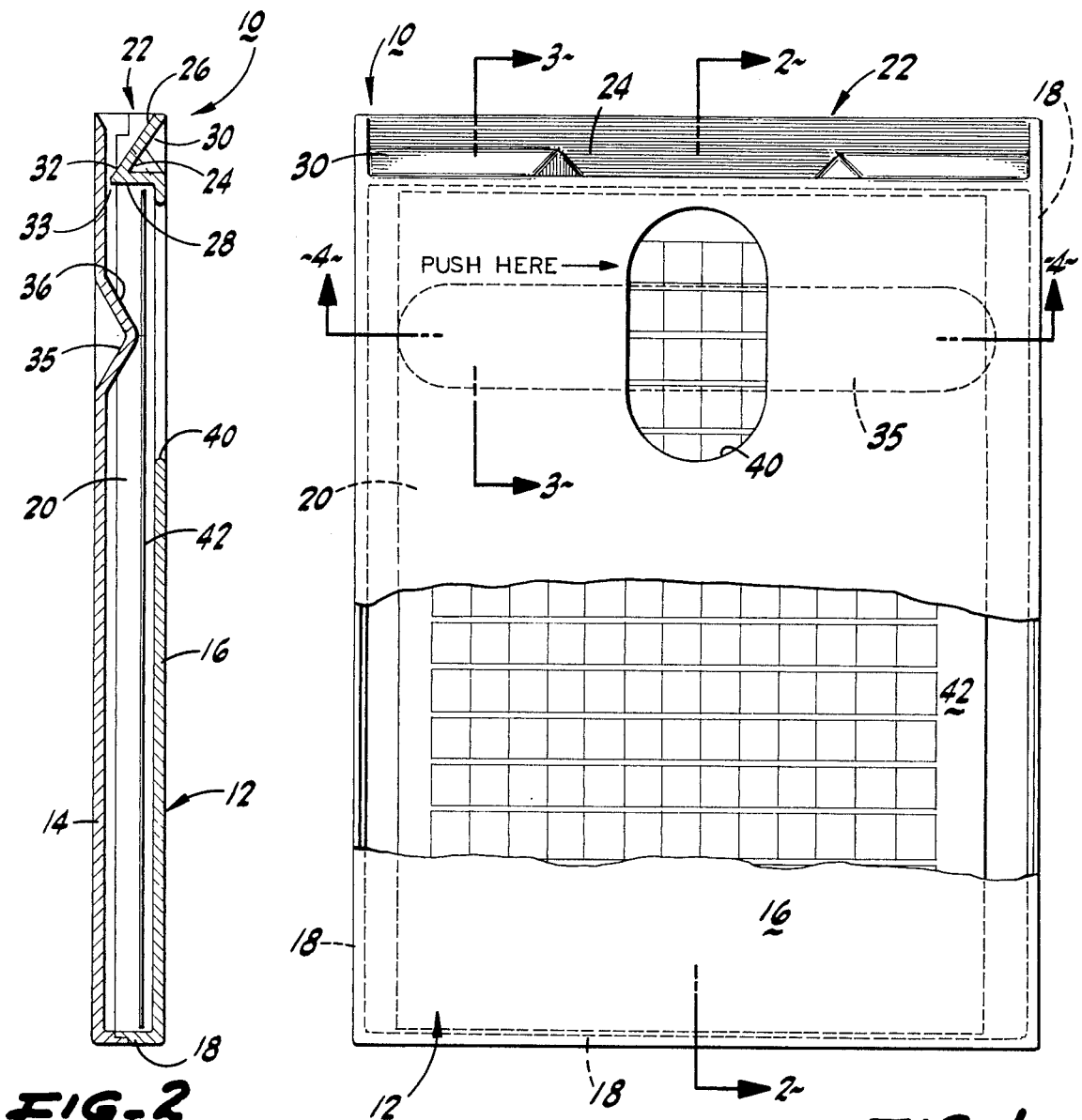
PUSH HERE
FIG-1
FIG-2
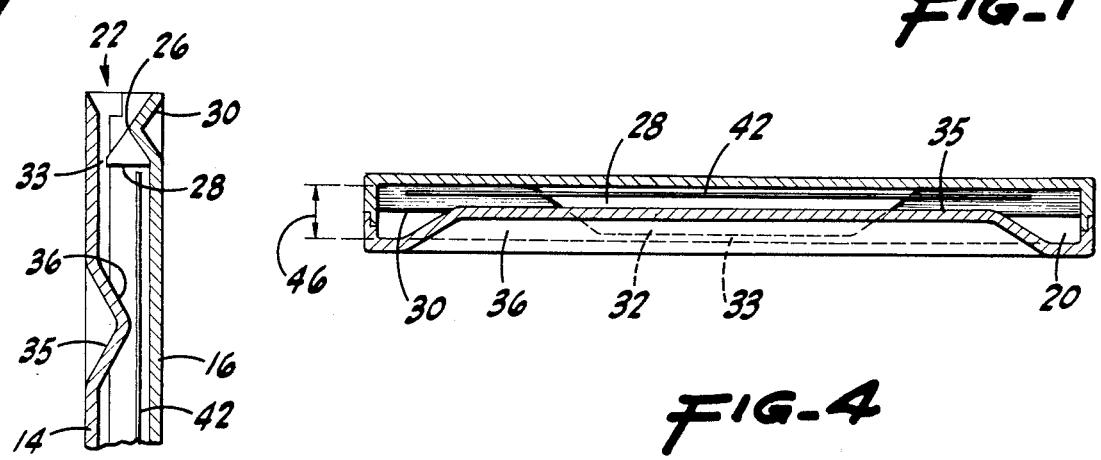
FIG-3
FIG-4

MEANS FOR HOLDING FLEXIBLE SHEETS

The invention relates generally to articles for holding, retaining, and transporting sheets of flexible material such as microfiche or the like.

Microfiche is an increasingly popular means for recording and storing graphic and written information. With microfiche, large quantities of such information can be condensed onto small and convenient sheets of flexible film material. The information is readily accessed by viewers or printing devices. Microfiche is particularly convenient for transmitting large quantities of information from one place to another in conveniently readable form.

In transporting microfiche, it is important that bending or folding be prevented since any crease or wrinkle of the film material will cause loss of recorded information. Envelopes or the like present risk of bending or folding and offer little protection. A more rigid means for conveniently storing and transporting microfiche is therefore needed.

It is a general object of the present invention to provide a means for holding flexible sheets of material such as microfiche which prevents bending or creasing of the flexible sheets.

Another object of the invention is to provide a means for holding flexible sheets which permits convenient and rapid access to the flexible sheets.

Another object of the invention is to provide a means for holding flexible sheets which is sufficiently sturdy and suitable for mailing.

Accordingly, means is provided for holding flexible sheets which comprises a rigid body having first and second major opposing walls. The body includes means for supporting the first and second major walls in spaced substantially parallel relation to define a cavity therebetween in the body. An access slot is formed in the body extending between the first and second major walls through which flexible sheets enter and exit the cavity. Blocking means in the form of a projecting lip extends from the first major wall into the cavity toward the second major wall, thereby partially blocking the access slot; such lip is provided adjacent the access slot to perform its slot blocking function. Camming means in the form of a ridge is formed on the scond major wall within the cavity positioned inwardly from the projecting lip and spaced from the lip. An opening is formed in the first major wall opposite the ridge which allows a flexible sheet positioned in the cavity to be contacted manually through the opening and guided around and between the ridge and the projecting lip for effecting convenient removal from the cavity.

A detailed description of the preferred embodiment of the invention is set forth below, with reference being made to the accompanying drawings in which:

FIG. 1 is a top plan view partially cut away of a holding means for flexible sheets in accordance with the present invention.

FIG. 2 is a side cross-sectional view of the holding means of FIG. 1 taken along line 2—2.

FIG. 3 is a partial cross-sectional view of the holding means of FIG. 1 taken along line 3—3.

FIG. 4 is an end cross-sectional view of the holding means of FIG. 1 taken along line 4—4.

Figure 5:
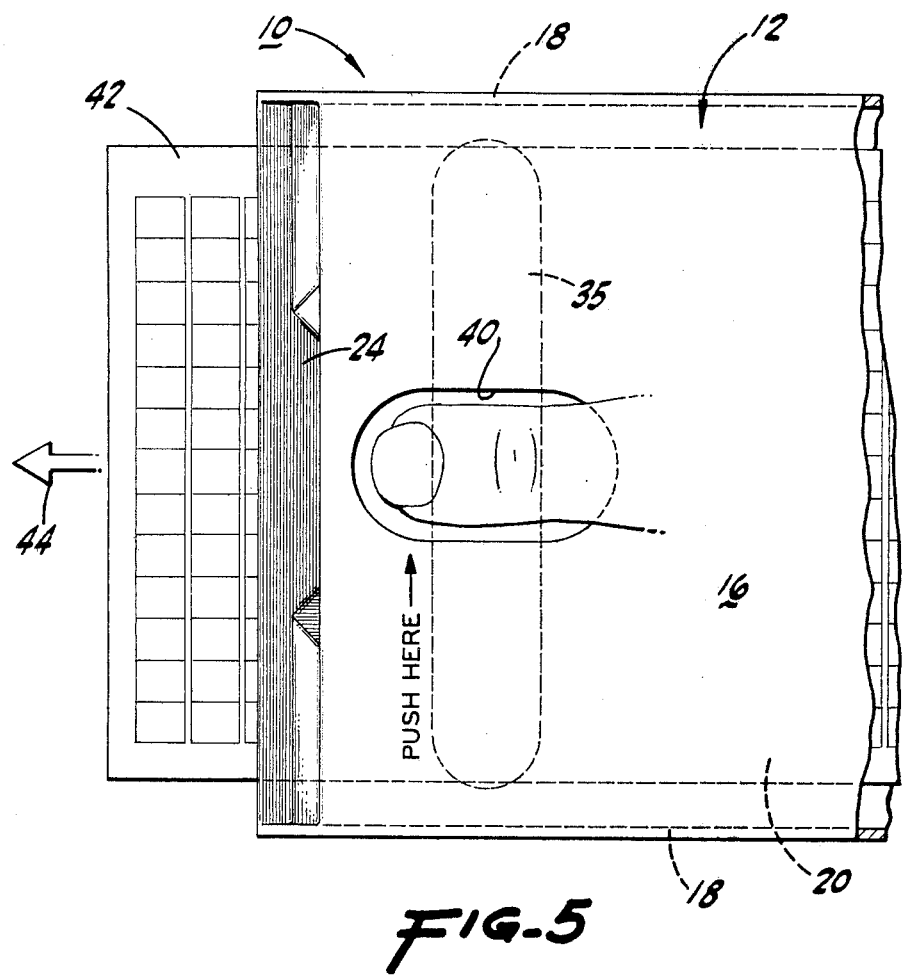
FIG. 5 is a partial top plan view of the holding means as in FIG. 1, illustrating the method of removing a sheet of flexible material from the holding means.

Referring to FIGS. 1 and 2, the preferred embodiment of a sheet holder means 10 for holding flexible sheets therein includes a body 12 formed of a relatively rigid material such as plastic. Body 12 includes a first major wall 14 and second major wall 16 which are generally rectangular in shape. Major walls 14 and 16 are joined along three sides by edge wall portions 18 extending between the major walls. Edge walls 18 support major walls 14 and 16 in their spaced substantially parallel relationship and enclose a relatively thin rectangular central cavity 20 within body 10.

Means is provided to give access to cavity 20 in the form of an open slot 22 formed in one end of holder 10. Slot 22 extends between major walls 14 and 16 and provides the opening through which microfiche or other flexible sheet material enters and exists cavity 20. Blocking means in the form of a projecting lip 24 extends from first major wall 16 toward second major wall 14 adjacent slot 22. In the preferred embodiment, lip 24 has an outer surface 26 facing outwardly from the slot which projects angularly from major wall 16 into cavity 20. The inner surface 28 of lip 24 is substantially perpendicular with respect to wall 16 to positively retain a flexible sheet within cavity 20. As shown in FIGS. 2, 3 and 4, lip 24 is defined by a V-shaped indentation 30 molded in wall 16 immediately adjacent the slot opening which terminates in an apex 32 positioned closely adjacent the interior of the opposite wall 14; thus, a narrow passageway 33 for a microfiche sheet to enter or exit the holder 10 is provided between apex 32 and wall 14.

Camming means is provided within cavity 20 on second major wall 14; such camming means is defined by a V-shaped ridge 35 extending into the cavity toward the opposite wall 16. In the preferred embodiment, ridge 35 is formed as a molded indentation in the plastic material defining wall 14. Ridge 35 includes an inclined surface 36 facing slot 22 to help guide the microfiche sheet over the ridge as it is inserted into the cavity 20 through passageway 33 and slot 22. Ridge 35 serves to cam or raise up one end of a microfiche sheet fully received within cavity 20 to maintain the sheet in alignment with the perpendicular inner surface 28 of the lip 24; as best seen in FIG. 2.

An opening 40 is provided in wall 16 opposite ridge 35 to allow a microfiche sheet in cavity 20 to be contacted manually and guided around and between ridge 35 and lip 24 through passageway 33 for removal from the holder. In the preferred embodiment, opening 40 is located midway between the sides of major wall 16 and overlies ridge 35 and adjacent portions of major wall 14. Opening 40 is preferably somewhat elongated in the direction in which the microfiche enters and exits the holder to allow a user to depress a leading portion of the microfiche sheet and to slide the microfiche out through slot 24 (see FIGS. 5 and 6).

In use, holder 10 can conveniently and safely hold one or more microfiche sheets 42 or similar sheets of flexible material. As a microfiche is inserted in slot 22, it is guided over projecting lip 24 by the incline of the outer surface 26. Passing further into cavity 20, the microfiche is guided over ridge 35 by inclined surface 36. Once completely inserted into holder 10, the microfiche will be held securely in holder 10 by the labyrinth-type lock formed by lip 24 and ridge 35. The lip and ridge cooperate to eliminate any straight path out of the holder for the microfiche sheet 42, thereby positively maintaining the sheet within cavity 20 until removal is desired.

Figure 6:
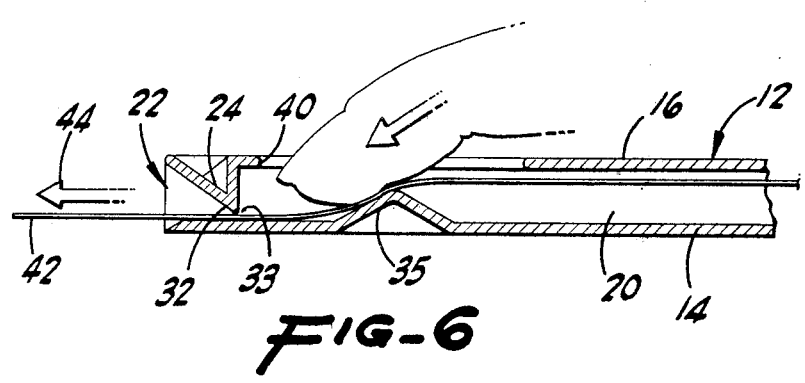
FIG. 6 is a side cross-sectional view of the illustration of FIG. 5.

Removal of the microfiche from the holder 10 is illustrated in FIGS. 5 and 6. A finger or other object is inserted into opening 40 to depress the outer portion of the microfiche downwardly against wall 14 adjacent passageway 33. The microfiche is then slid underneath lip 24 through passageway 33 in the direction of arrow 44 until the leading portion thereof projects through slot 22. The microfiche can then be grasped from outside the holder and pulled from the holder.

In the preferred embodiment, both projecting lip 24 and ridge 35 extend more than half way across the width of cavity 20; the width being the distance 46 (FIG. 4) between major walls 14 and 16. The labyrinth effect is the result of the lip and ridge having a combined dimension which exceeds the width of cavity 20 and slot 22. Consequently, the lip and ridge extend from their respective walls slighly past one another to create the labyrinth-type lock.

Preferably, the holder 10 of the present invention is formed of a suitable molded material such as clear plastic. Major wall 16 and portions of the three edge walls 18 together with projecting lip 24 can be formed in a single molding operation. Major wall 14 and portions of edge walls 18 together with ridge 35 can be molded in another molding operation. The two halves of the holder thus formed can then be fitted together and secured to one another with a suitable adhesive to complete the holder.

The invention provides a safe and convenient way to transport and store one or more microfiche sheets. The holder is extremely rugged, lightweight, and affords excellent protection against folding, bending or wrinkling of the microfiche. The holder is thin enough to be transported conveniently through the mails in an addressed envelope and can be reused an indefinite number of times. There is virtually no chance of accidental removal of the microfiche from the holder, but removal is conveniently effected when desired.

The present invention provides a means for holding flexible sheets of material such as microfiche while preventing bending or creasing of the flexible sheets. The invention provides means for holding flexible sheets which permits convenient and rapid access to the flexible sheets. In addition, the invention provides means for holding flexible sheets which is also suitable for mailing flexible sheets without risk of damage.

What is claimed is:

1. A re-usable multiple-use holder for transporting generally flat, flexible sheets and for protecting such sheets against damage during such transport, as through the mails or the like; said holder comprising a generally rigid body defined by opposed spaced walls providing a sheet receiving cavity therebetween; an access slot defined by said walls at one end of said holder through which individual sheets selectively may be inserted into and removed from said cavity; means positioned within said cavity and extending from one of said walls toward the other of said walls partially blocking said access slot, said blocking means having an inclined outer surface, which facilitates introduction of individual sheets through said access slot into said cavity, and an abrupt inner surface, which prevents unwanted removal of individual sheets from said cavity through said access slot; rigid camming means positioned within said cavity and extending from said other wall toward said one wall, said camming means having an inclined surface generally facing said access slot over which individual sheets introduced into said cavity are guided, said camming means being positioned adjacent said blocking means and maintaining individual sheets positioned within said cavity in generally flat relationship with respect to said one wall and generally in alignment with said abrupt surface of said blocking means so that unwanted removal of individual sheets from said cavity is precluded; said one wall having an opening therein generally opposite said camming means to permit manual access to individual sheets positioned within said cavity whereby an individual sheet, or individual sheets in sequence, may be manually contacted and guided over said camming means and around and over said blocking means to be freed of the blocking effect of said blocking means and introduced into said access slot for selective removal from said holder.

2. The holder of claim 1 in which said abrupt inner surface of said projecting lip extends substantially perpendicular to said one wall whereby individual sheets in said cavity abut said inner surface and are positively prevented thereby from unwanted removal from said cavity.

3. The holder of claim 1 in which the distance between said walls defines the width of said cavity and of said access slot, said blocking means extending from said one wall a distance which, when combined with the distance said camming means extends from said other wall, exceeds said width of said cavity and of said access slot to thereby create a labyrinth passageway through which flexible sheets selectively may be inserted into and removed from said cavity.

4. The holder of claim 1 in which the distance between said walls constitutes the width of said cavity and of said access slot, said blocking means extending from said one wall more than half way across said width of said access slot and said camming means extending from said other wall more than half way across said width of said cavity.

5. The holder of claim 1 in which said walls are generally rectangular, said holder including other spaced walls supporting said first mentioned walls in spaced substantially parallel relationship to each other and defining with said first mentioned walls an elongated generally flat holder body suitable for mailing with its contents in a flat envelope.

* * * * *